US007352710B1

(12) United States Patent
Panburana et al.

(10) Patent No.: US 7,352,710 B1
(45) Date of Patent: Apr. 1, 2008

(54) SYMMETRICAL CODEC SELECTION IN AN ASYMMETRICAL CODEC ENVIRONMENT

(75) Inventors: Pandit Panburana, Cary, NC (US); Tyrone D. Floryanzia, Cary, NC (US); Michael Gregg Miles, Hillsborough, NC (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/683,689

(22) Filed: Oct. 9, 2003

Related U.S. Application Data

(63) Continuation of application No. 09/315,860, filed on May 20, 1999, now Pat. No. 6,633,582.

(51) Int. Cl.
*H04L 12/56* (2006.01)
(52) U.S. Cl. ............... 370/282; 370/252; 370/477; 709/247
(58) Field of Classification Search ............ 370/278, 370/282, 229, 230, 329, 341, 437, 477, 252, 370/468; 709/204, 246, 247; 712/36
See application file for complete search history.

(56) References Cited

U.S. PATENT DOCUMENTS 6,055,619 A * 4/2000 North et al. ............... 712/36
6,175,856 B1 * 1/2001 Riddle ....................... 709/204

* cited by examiner

*Primary Examiner*—John Pezzlo
(74) *Attorney, Agent, or Firm*—Stolowitz Ford Cowger LLP

(57) ABSTRACT

A codec selector, and a corresponding method for establishing media channels between a local endpoint and a remote endpoint, are disclosed. The codec selector and method are useful with a media endpoint that is constrained to have matching transmit and receive codecs. The method comprises sending a request to a remote endpoint to open a first transmit channel. Upon receiving a corresponding request from the remote endpoint for its transmit channel, the two requests are compared. If the two requests do not match, the first transmit channel is closed (whether or not it has been acknowledged by the peer). A second transmit channel, compatible with the remote endpoint's request, is then requested. A method for detecting that the remote endpoint is using a similar procedure, and a procedure for synchronizing when both endpoints are constrained, are also disclosed.

The present invention reduces call setup time in most instances, and provides reliable channel setup for constrained endpoints.

32 Claims, 11 Drawing Sheets

SYMMETRICAL CODEC SELECTION IN AN ASYMMETRICAL CODEC ENVIRONMENT

This application is a continuation of prior U.S. Ser. No. 09/315,860, filed May 20, 1999 now U.S. Pat. No. 6,633,582.

FIELD OF THE INVENTION

This invention pertains generally to packet-switched multimedia communications, and more particularly to media bearer channel setup for endpoints requiring symmetrical codecs.

BACKGROUND OF THE INVENTION

H.323 is a standard promulgated by the International Telecommunications Union (ITU) for multimedia communications over local-area networks (LANs) utilizing Internet Protocol (IP) or another packet-switched medium. The H.323 standard is attractive, for one, because it is a flexible standard appearing in a field dominated by proprietary designs that offer little hope for interoperability between different vendor's equipment. Thus, H.323 offers the hope of a world where different vendor's equipment and different carrier's networks can and will communicate seamlessly. The H.323 standard is also attractive because it allows an administrator some measure of control over the amount of voice, video, and other multimedia traffic traversing a packet-switched network that has no other quality-of-service guarantees.

An H.323 call requires that several connections be set up between the calling endpoints. The first of these is a TCP/IP connection for the communication of basic call functionality. ITU-T recommendation H.225 describes the call signaling functionality that is provided on this channel (a variation on Q.931 signaling).

The second connection is a control channel that orchestrates multimedia data communications between the endpoints. This second connection set up between endpoints is also a TCP/IP connection (note that with H.323 version 2, a single TCP/IP connection can in some cases be used for both the first and second connections). ITU-T recommendation H.245 describes the control protocol to be used on this channel. A number of different services may be provided over an H.245 call control channel, including master/slave endpoint determination, audio/visual and data capabilities exchange, and the management of logical channels used to transport audio/visual and data information.

In particular, the audio/visual and data capabilities exchange is intended to ensure that the only multimedia signals that are transmitted are those that can be received and understood by a receiving endpoint. To implement this, each endpoint transmits a capability set to the other, indicating what types and combinations of information streams it can accept. For example, H.323 allows endpoints to implement one or more audio codecs, including ITU audio codec specifications G.711 (required), G.722, G.723.1, G.728, and G.729, some of these having multiple possibilities for bit rate and other settings. An endpoint can, e.g., identify G.711, G.722, and G.729 in its capability set, signaling its peer endpoint that it may choose to open a logical channel for any one of these three identified audio codecs, but not for any other.

Because each H.323 transmitting endpoint can open a logical channel corresponding to any one of its peer's advertised capabilities, it is possible that the endpoints will select different transmit capabilities. This results in the creation of asymmetrical logical channels, e.g., a G.711 audio channel in one direction and a G.729 audio channel in another.

Many systems can simultaneously operate one codec for transmitting, and another for receiving, thus allowing them to function with asymmetrical logical channels. But in some terminal configurations, it may be advantageous or necessary to constrain an endpoint to only symmetrical codec selection. If asymmetrical logical channels are set up with such an endpoint, its user may hear incoherent audio or nothing at all.

SUMMARY OF THE INVENTION

The H.245 recommendation fails to provide a reliable solution to the asymmetrical channels/symmetrical endpoint problem. H.245's general conflict resolution scheme, if applied to this problem, may result in long setup delays, or in the worst case, no resolution of the problem at all.

Although an endpoint desiring to establish symmetry with its peer could wait and see what codec its peer selects before making its selection, this may also result in unacceptable media setup delays. This approach would also potentially hang a connection when both ends choose to wait for the other to go first in opening a logical channel.

The present invention offers a reliable, low-delay solution for multimedia endpoints that desire or require symmetrical codec selection. This solution guarantees that an endpoint desiring symmetrical codecs can achieve this desire, whether it is master or slave, whether it's peer can recognize conflicts or not, whether it's peer also desires symmetrical codecs, and without regard to the vendor implementing the peer equipment. The solution is also low-delay, as it reacts proactively to conflicts, and without imposing fixed system delays.

In one aspect of the present invention, a method of establishing media connections with a remote endpoint is disclosed. An endpoint that desires a symmetrical connection opens a first logical channel of a type selected from its peer's capability set—a type that also matches a codec that it desires to receive. It does this without waiting to see which type of codec its peer actually requests for the incoming channel. If the peer requests a symmetrical channel, the two-way connection has been established with minimum delay. If the peer requests an asymmetrical channel, the endpoint closes its first logical channel and opens a second, using a codec that matches the peer's.

The present invention also includes a procedure for detecting and recovering from a situation where both endpoints close and open logical channels in an effort to match their peer's codec selection. One endpoint detects the condition and delays further channel open/close efforts, preferably for one measured round trip time, to allow the other end to establish the symmetrical channel.

In another aspect of the invention, a codec selector is disclosed. The codec selector comprises a codec conflict detector that detects conflicts between locally-requested and remotely-requested codecs. The codec selector also comprises a codec synchronizer that responds to a conflict detected by the codec conflict detector by closing a locally-requested codec and requesting a different codec that does not conflict with the remotely-requested codec.

This codec selector may be embodied, e.g., in a media gateway or in a media gateway controller. For example, it may be used to resolve conflicts in a media gateway that has a plurality of receive codecs and a plurality of transmit codecs, the gateway constrained such that some combinations of a receive codec and a transmit codec cannot be used on the same call.

BRIEF DESCRIPTION OF THE DRAWING

The invention may be best understood by reading the disclosure with reference to the drawing, wherein.

DETAILED DESCRIPTION OF THE PREFERRED EMBODIMENTS

The preferred embodiments are described below as applied to H.323/H.245-compliant connections and channels. These embodiments are exemplary, as it will be recognized that the invention may be applied to other communication protocols that allow endpoints to select channel types from amongst a group of capabilities. Likewise, although the H.245 terms "master" and "slave" are used frequently herein, it will be recognized that equivalent implementations may be obtained by reversing roles and/or using equivalent designations. For example, where applicable, one endpoint can be thought of as "leading" in a transaction, and the other as "following".

Figure 1:
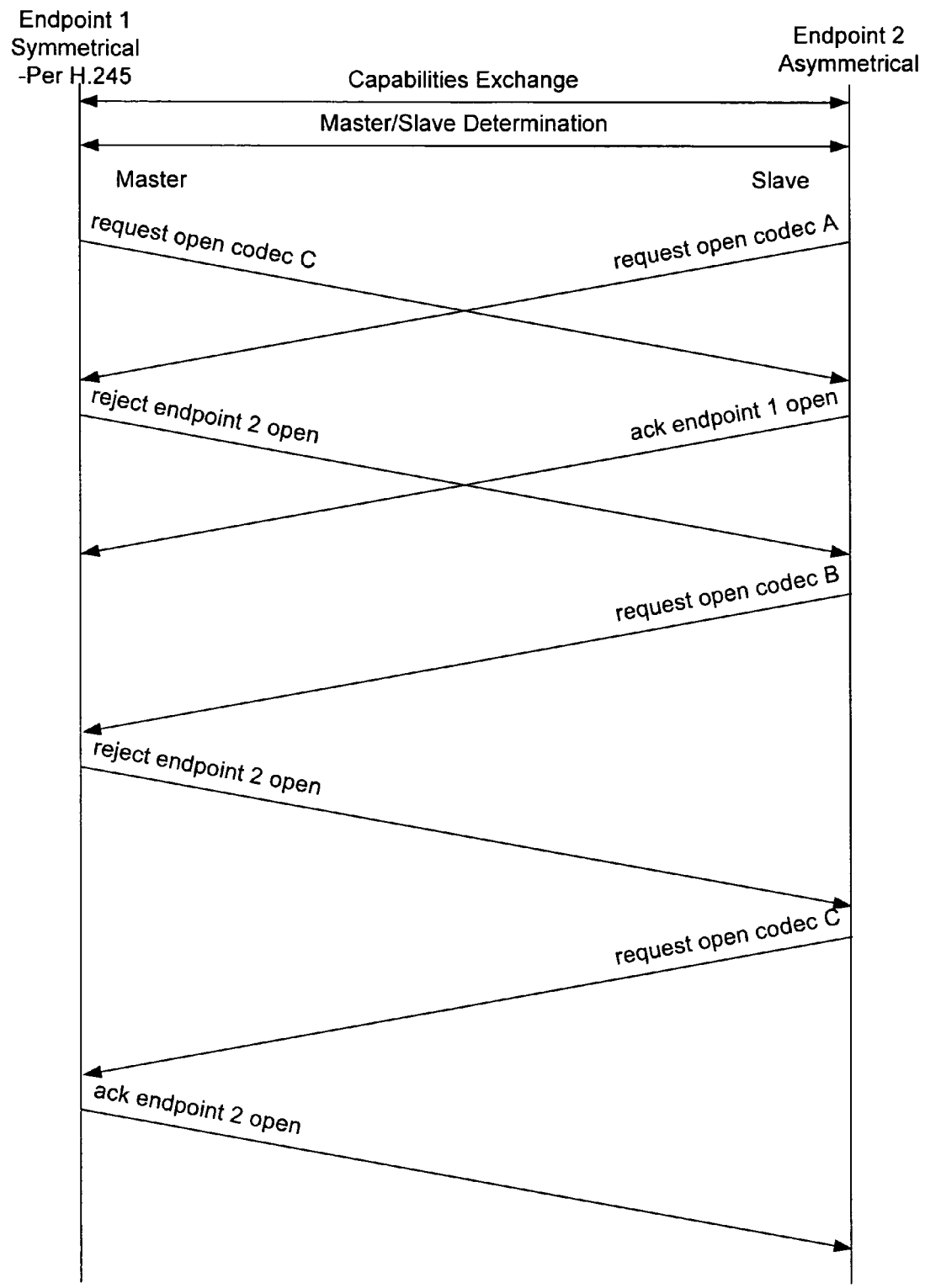
FIGS. 1 and 2 show possible message exchanges between two H.323-compliant endpoints attempting to use the H.245 conflict resolution scheme to correct codec asymmetry.
Figure 2:
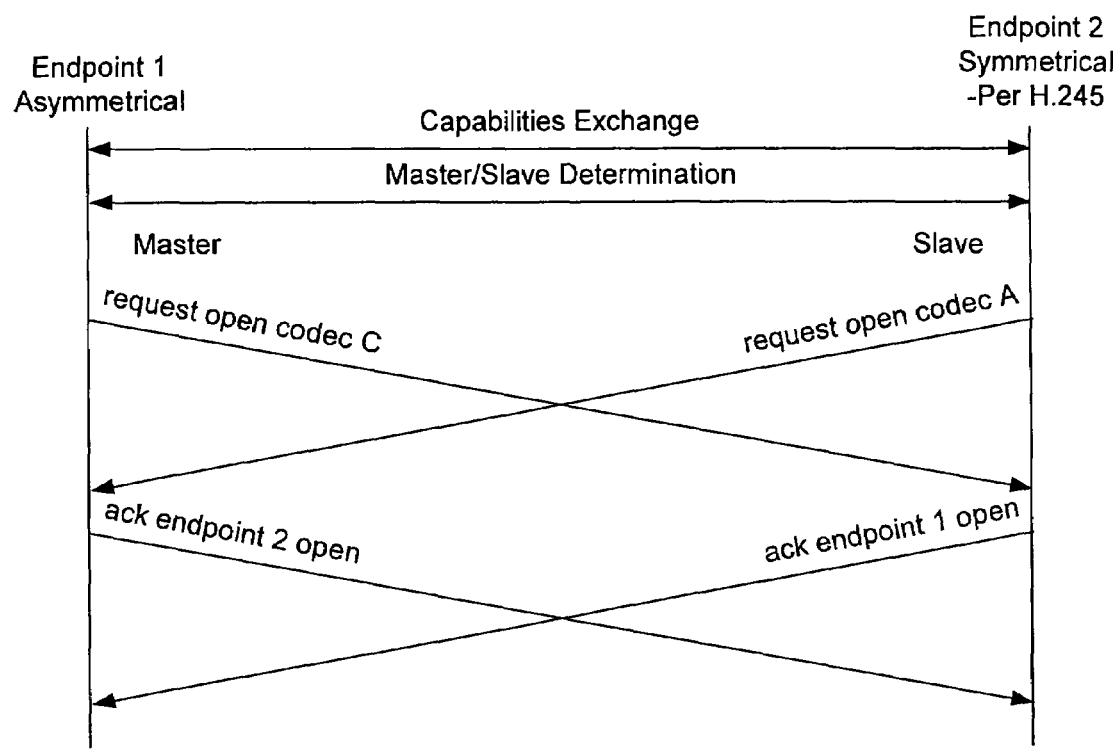

Conflict resolution under several schemes not according to the invention will now be described, in order that the following description of the preferred embodiments can be better appreciated. First, FIGS. 1 and 2 show possible message exchanges between two H.323-compliant endpoints attempting to use the H.245 conflict resolution scheme to correct codec asymmetry. The H.245 conflict resolution scheme requires that one endpoint be pre-designated as "master", and the other as "slave", prior to the conflict arising. If the master identifies a request from the slave that is "conflicting" with its own requests, it is required to reject that slave request immediately. The slave, on the other hand, must respond affirmatively to the master's request, even if it knows the request to be conflicting with its own.

FIG. 1 shows one possible message exchange, between a master endpoint that desires symmetrical codecs and a slave endpoint that can not only handle asymmetry, but that doesn't recognize the master's symmetry needs. Each endpoint first transmits a capability set to the other during capabilities exchange. In this example, both endpoints indicate that they can support codecs "A", "B", and "C". After master/slave designation (according to H.245's described method, or an equivalent), the master (endpoint 1) requests that a logical channel be opened using codec C. The slave (endpoint 2), before receiving the master's request, requests that a logical channel be opened using codec A.

When the master receives the slave's request, it knows that a conflict has arisen, and it immediately sends a response to the slave, rejecting the slave's request. The slave, on the other hand, is required to send a response acknowledging the master's request.

Sometime later, the slave is notified that its open logical channel request has been rejected. As it knows of no conflict, it may become confused and try to open with codec A again. In this example, however, it moves on to the next codec in the list (B) instead. This codec is also rejected. Moving on again, it tries C, and is this time acknowledged. This exchange takes more than three round trip-times to complete, during which time the slave cannot transmit audio data to the master.

FIG. 2 shows a reversed situation, where the slave endpoint desires symmetrical codecs and the master endpoint can not only handle asymmetry, but doesn't recognize the slave's symmetry needs. Again, the master endpoint issues an open logical channel request for codec C, and the slave endpoint issues its request for codec A. When the master's request arrives at the slave, the slave may recognize the conflict, but is bound to acknowledge the master's request. The master, sensing no conflict, acknowledges the slave's request. The slave is left in an inoperable state.

In order to ensure that it knows its peer's codec selection before making its own selection, a symmetrical codec-only endpoint could be designed to wait before attempting to open a logical channel. For instance, a scheme could be devised where when such an endpoint is made master, it would wait for a fixed delay, longer than the longest expected delay for receiving an open-channel request from its peer, before issuing its own open channel request. When the endpoint is made slave, it would likewise wait, e.g., for twice this first fixed delay.

Figure 3:
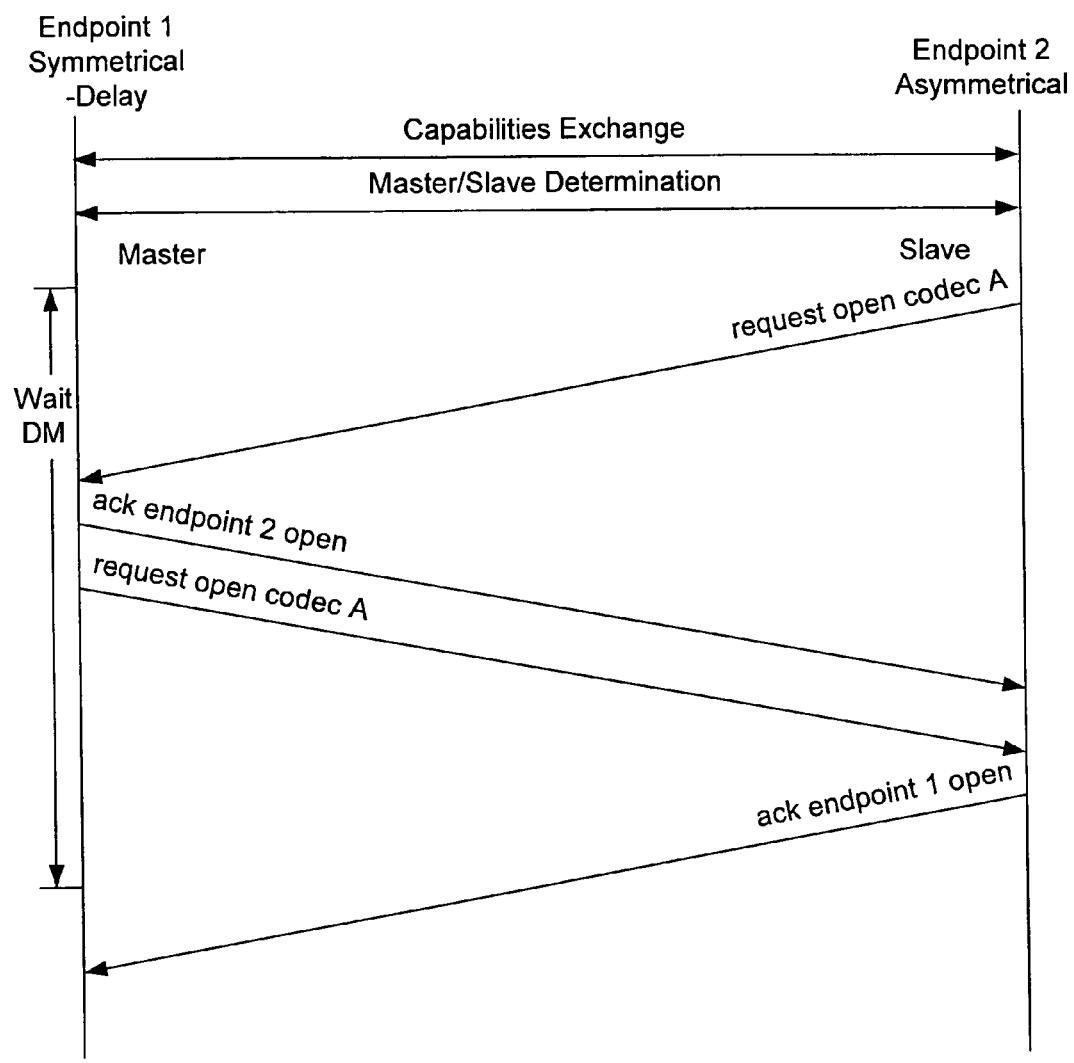
FIGS. 3, 4, and 5 show possible message exchanges between two H.323-compliant endpoints attempting to use a non-preferred approach to correct codec asymmetry.

FIG. 3 illustrates a message exchange under a first scenario using this delay scheme. The symmetrical master initially waits for a delay DM, looking for the open logical channel request from the slave. When it receives this request, it mirrors the slave's codec in its own request. In this best-case scenario, approximately 1.5 round trip times are required to establish the logical channels.

Figure 4:
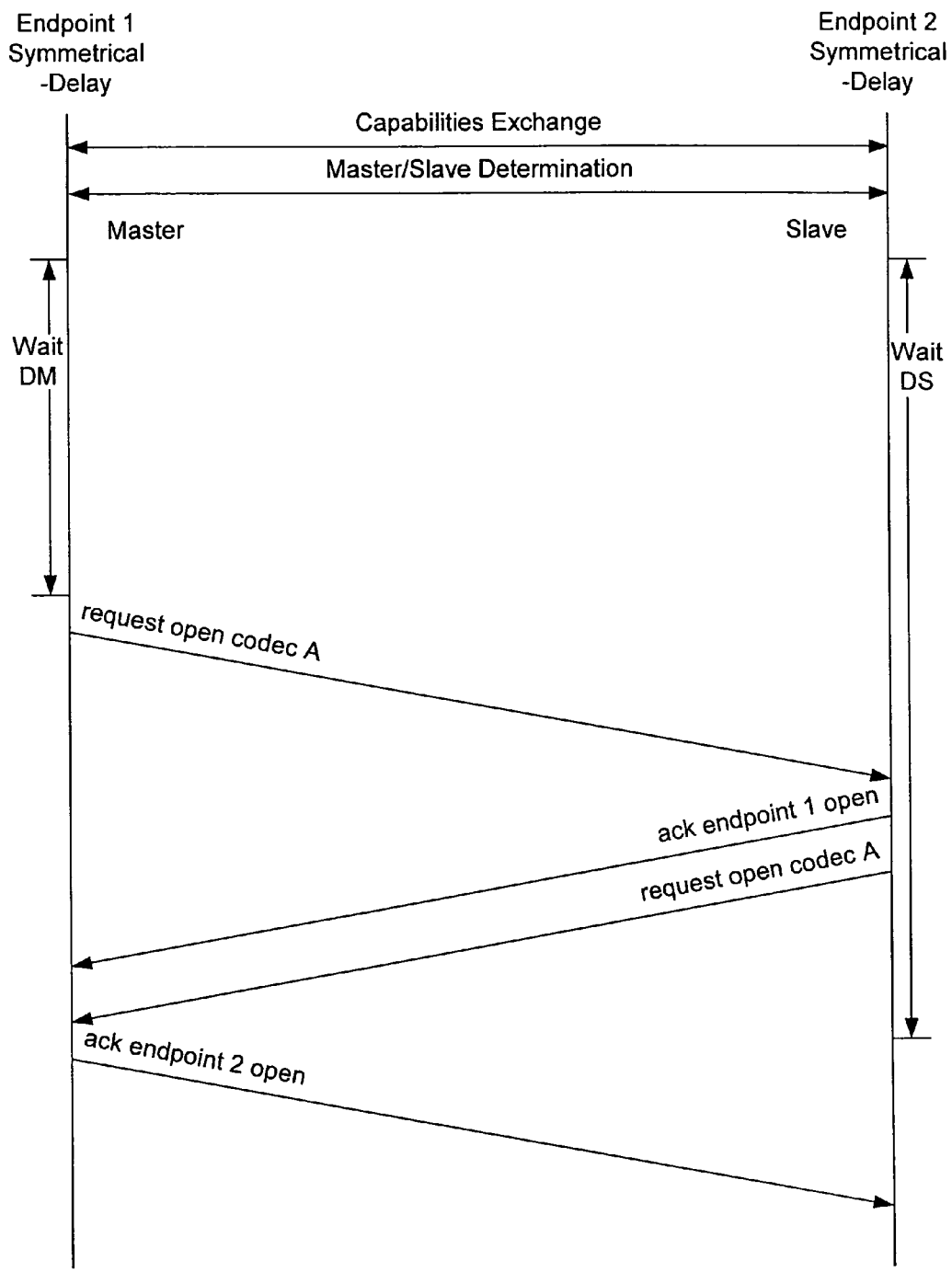

In the message exchange of FIG. 4, this symmetrical master is paired with a symmetrical slave. The slave initiates a delay DS (approximately twice DM), and the master initiates its delay DM. At the expiration of DM, the master has received no open channel request, so it assumes that the slave is symmetrical and sends an open channel request. The slave, still waiting, receives this request some time later, and mirrors it. Unfortunately, since DM and DS need to reflect worse-case delays, the delay observed by the users in this case may be considerable.

Figure 5:
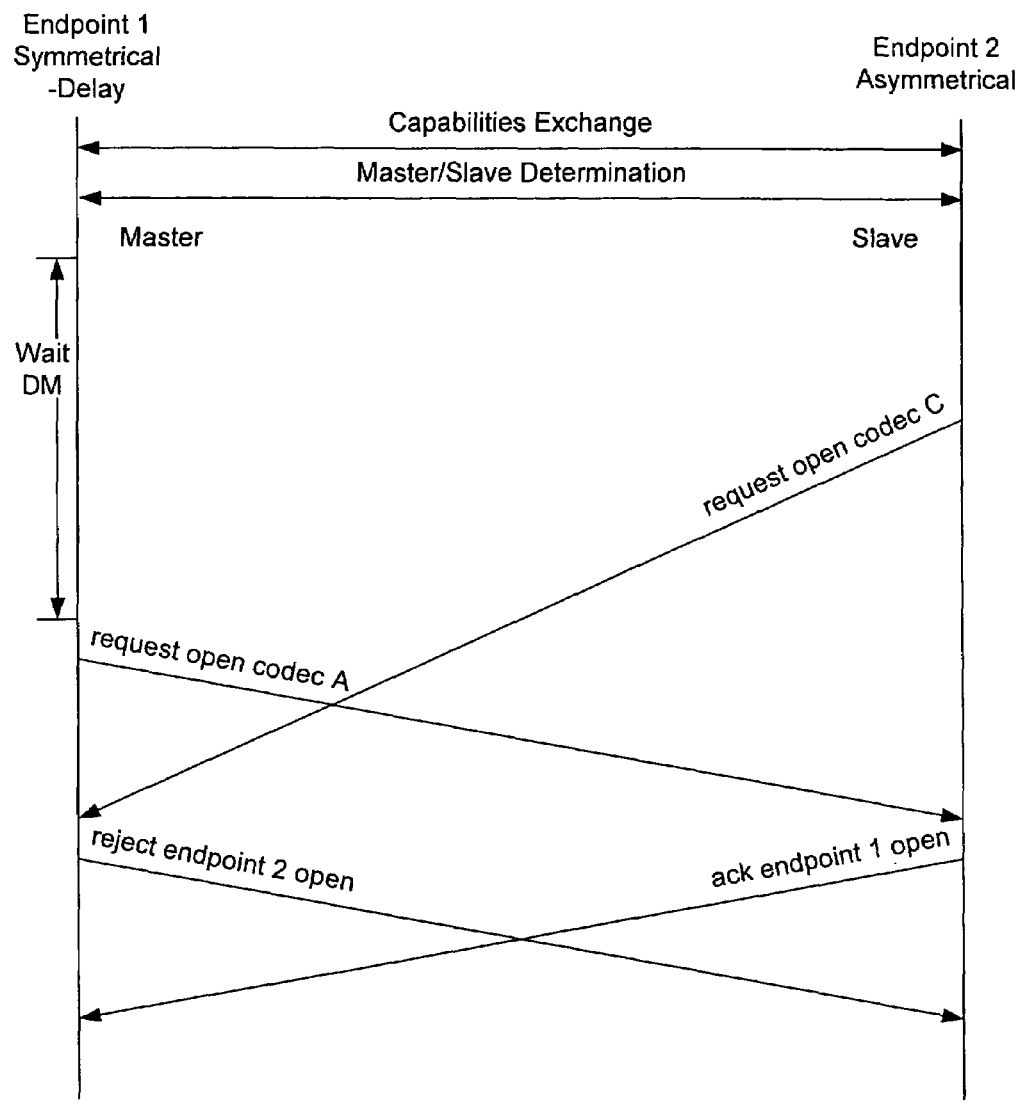

This particular scheme also can result in malfunction if for some reason (i.e., an underlying transport layer loses and then has to resend a message) a request is not received within the expected time frame. FIG. 5 illustrates such a case. An asymmetrical slave sends a request to a waiting symmetrical master, but the request is delayed past the expiration of DM. The master issues a request for a different codec, and rejects the slave's request. The slave must then try to guess the master's intentions, much as the slave had to in the example of FIG. 1.

Figure 6:
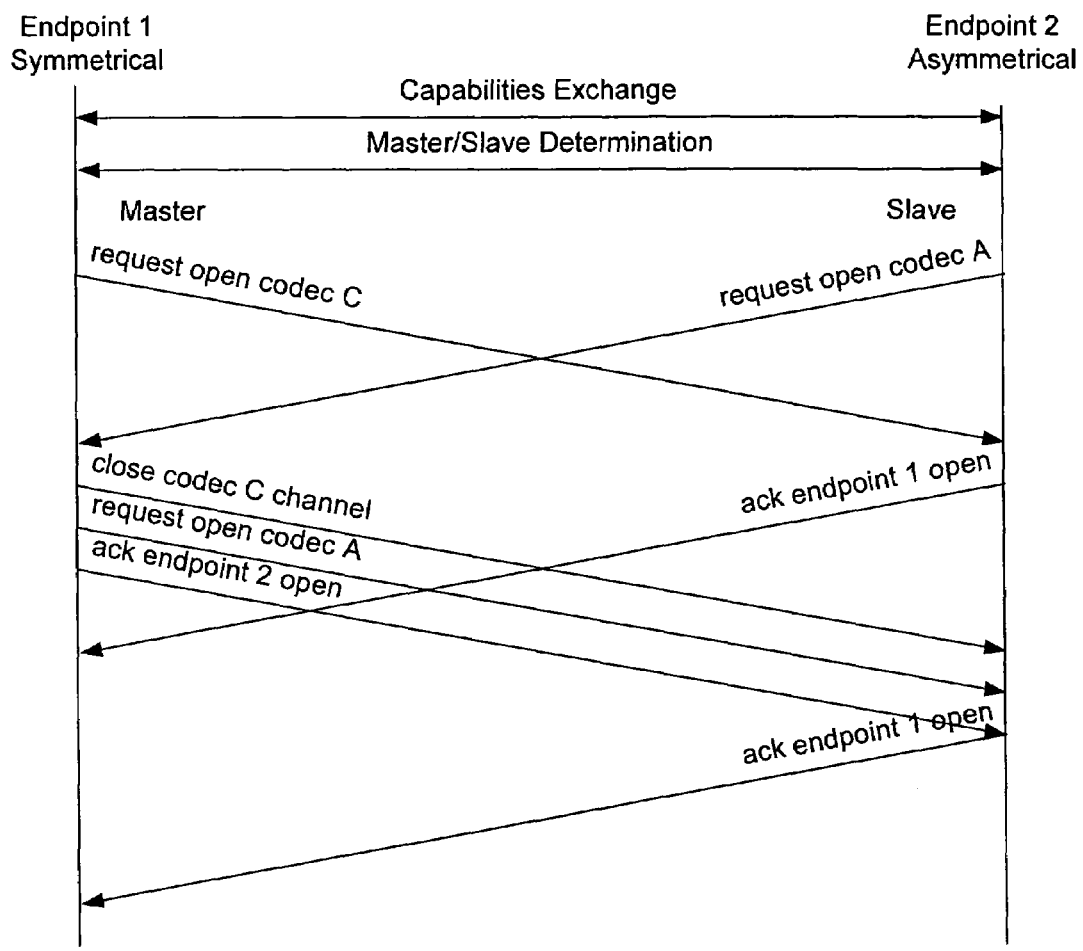
FIG. 6 shows a possible message exchange between a symmetrical codec-only master endpoint utilizing an embodiment of the invention, and an asymmetrical slave endpoint.

The present invention complies with the conflict resolution requirements of H.245, but takes a distinctly different, and proactive, approach to resolving symmetry conflicts. FIG. 6 illustrates the simplest conflict scenario handled by the invention, one with a symmetrical master and an asymmetrical slave. Like in the non-preferred examples of FIGS. 1 and 2, the master in this example requests a logical channel for codec C, and the slave effectively simultaneously requests a logical channel for codec A. The slave acknowledges the master's request, as it is bound to by protocol, although it senses no conflict. The master, however, upon receiving the slave's request, senses the potential conflict. But instead of rejecting the slave's request according to the general H.245 conflict resolution scheme, the master instead acknowledges the slave's request and revokes its own request by issuing a close logical channel request, thereby averting the conflict. It then mirrors the slave's request in a new open logical channel request.

By the time the master receives the slave's acknowledgment of the master's first request, its second request should be well on its way to the slave. Thus the conflict has been resolved in only half a trip time more than the no-conflict set up time. Note also that whereas the "delay" scheme of FIG. 3 slowed channel establishment whether a conflict was likely to occur or not, no extra delay is incurred by this embodiment of the invention if there is no potential conflict.

Figure 7:
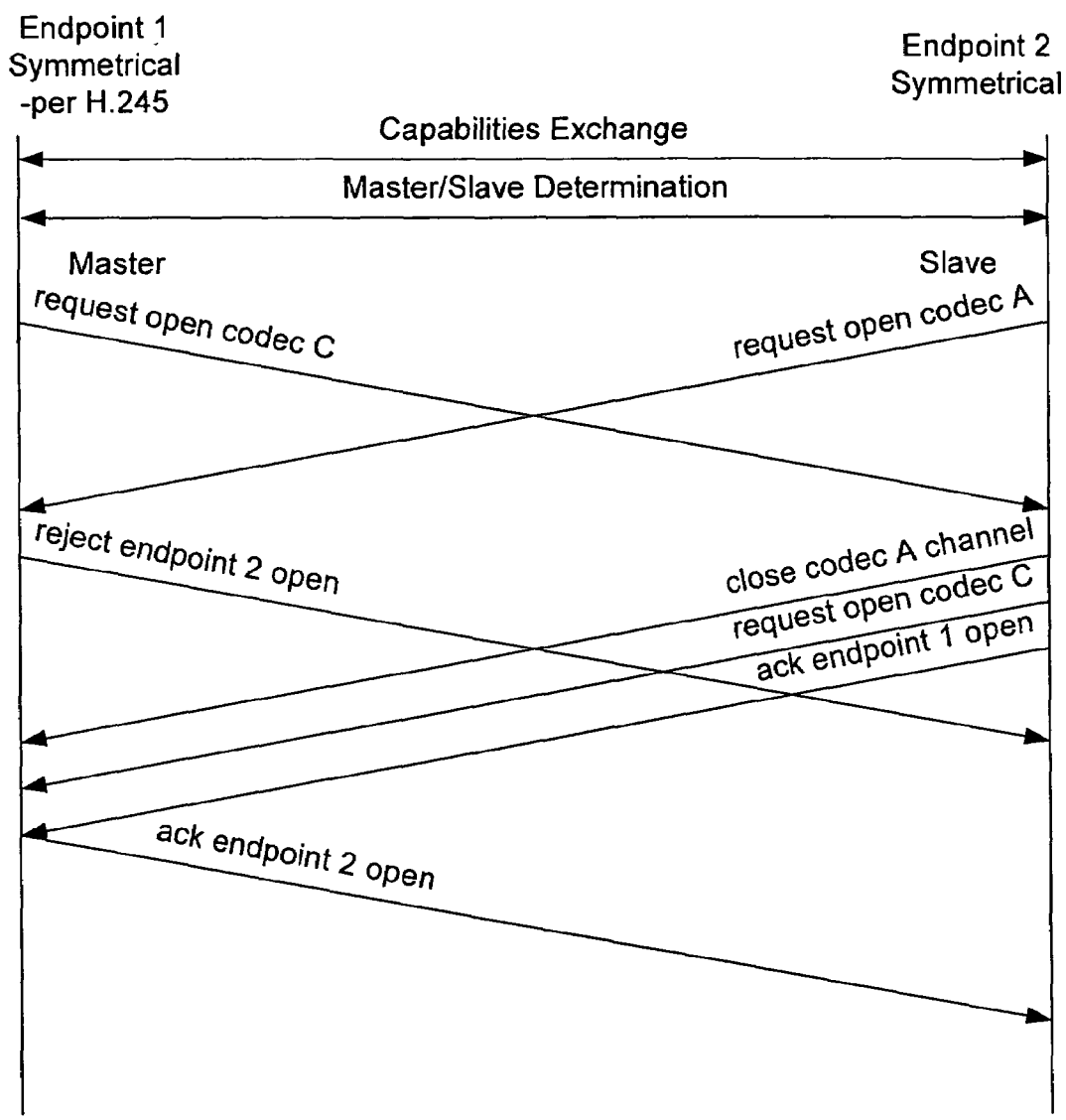
FIG. 7 shows a possible message exchange between a symmetrical codec-only master endpoint utilizing the H.245 conflict resolution scheme and a symmetrical codec-only slave endpoint utilizing an embodiment of the invention.

In the example of FIG. 7, the symmetrical endpoint operating according to an embodiment of the invention is the slave, and it is paired with another symmetrical endpoint—this one, however, implements only basic H.245 conflict resolution. Upon receiving the master's open channel request, the slave foresees the upcoming conflict. Instead of waiting for the forthcoming rejection of its own request, the slave issues a close logical channel request, followed immediately by a new open channel request that mirrors the master's request. The master issues its rejection as expected, but receives a conforming request only half a round trip time later.

Figure 8:
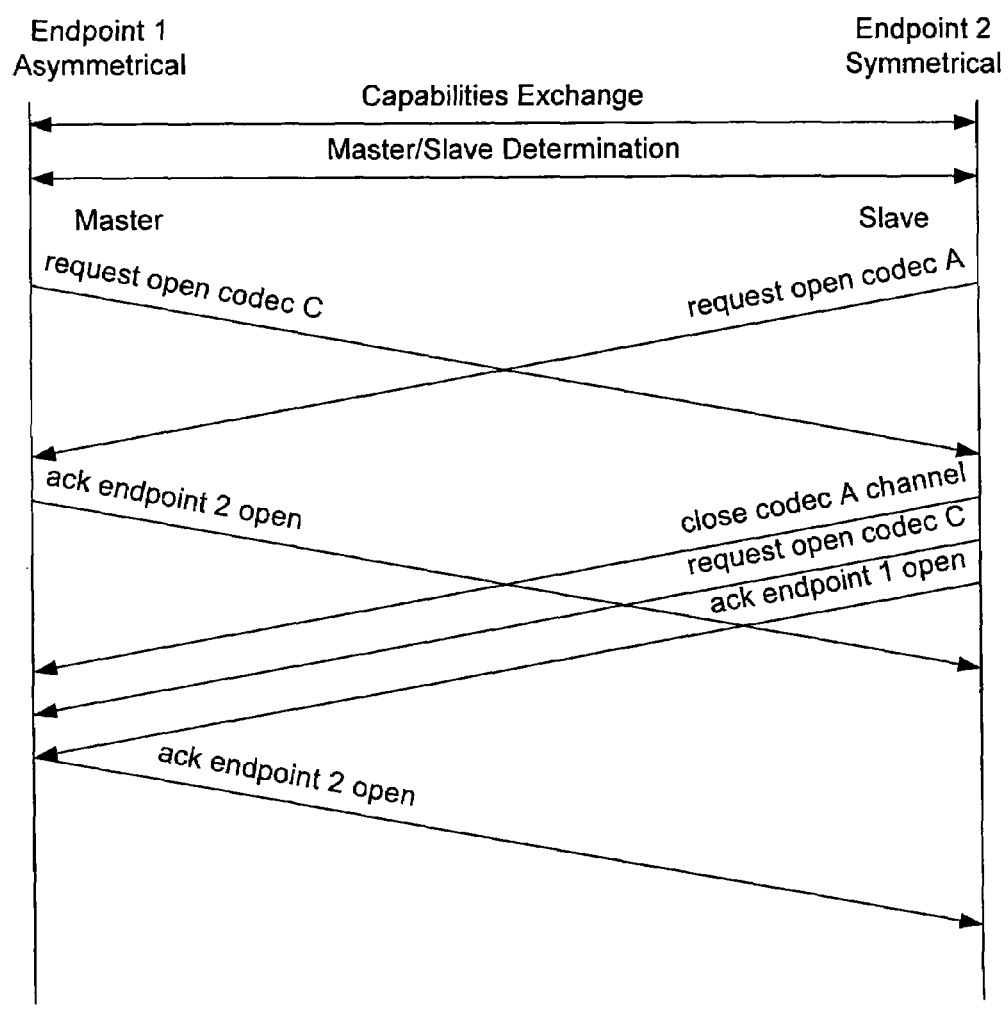
FIG. 8 shows a possible message exchange between an asymmetrical master endpoint and a symmetrical codec-only slave endpoint utilizing an embodiment of the invention.

FIG. 8 shows a similar scenario, but with the master endpoint allowing asymmetrical operation. Although in this example the master acknowledges, instead of rejects, the slave's first open channel request, this is immaterial to the slave. By the time the slave receives the master's response, it has already identified the conflict and closed the first channel, whether the channel is allowable or not. Therefore, it can be appreciated that this embodiment works efficiently without regard to the desires and operational particulars of the endpoint that it is peered with. It can also be appreciated from the examples of FIGS. 6, 7, and 8 that an embodiment of the invention would also operate when paired with an endpoint implementing the delay scheme described in conjunction with FIGS. 3, 4, and 5.

Indeed, the biggest challenge for a device utilizing the embodiments as described thus far is in communicating with an identical device. This scenario is played out in the message exchange of FIG. 9. Although non-standard messages could also be used to handle such a situation, the preferred embodiment avoids the use of proprietary signaling.

Figure 9:
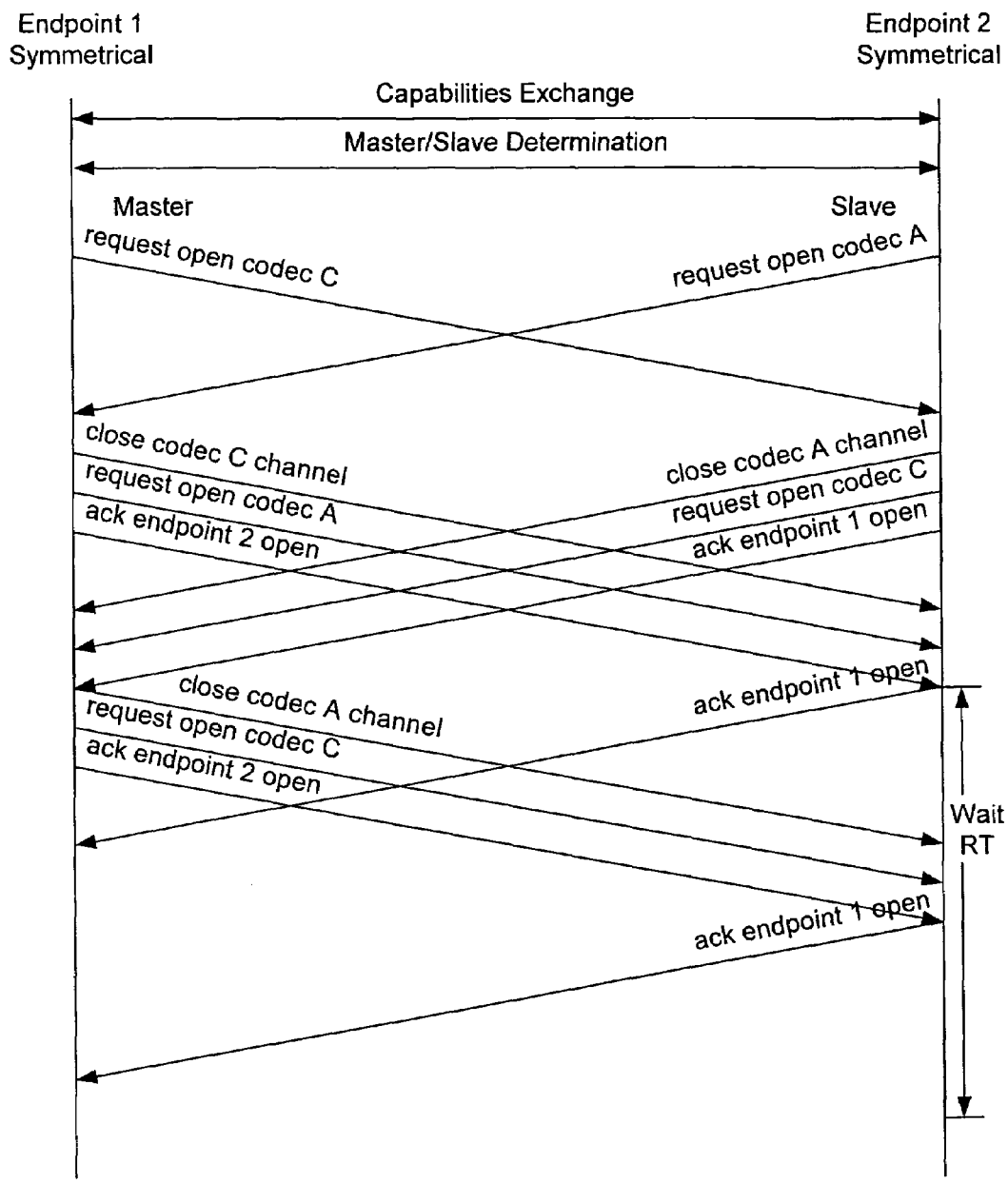
FIG. 9 shows a possible message exchange between two symmetrical codec-only endpoints, both operating according to an embodiment of the invention.

Referring to FIG. 9, both master and slave desire symmetrical codecs, but choose different initial codecs. As both are operating according to the invention, when they receive the other's request they each see a potential conflict, and close their initial codec to avoid it. The master then requests the slave's codec, and the slave requests the master's. Unless this process is somehow halted, the two requests may "Ping-Pong" between the two endpoints indefinitely.

Preferably, an endpoint operating according to the invention operates to detect an impending Ping-Pong problem and avoid it. This generally requires that one endpoint stop closing and opening channels, so that the other can synchronize to it. In the embodiment of FIG. 9, the slave implements the Ping-Pong detection process.

The slave preferably checks for Ping-Pong conditions when it receives a request to open from its peer. In one embodiment, the condition is inferred if the slave has already re-opened once to avoid a mismatch, and yet a mismatch persists. In other embodiments, the slave can track the master's requests, the sequencing of master and slave requests, etc., to improve the accuracy of the inference. The master may likewise detect a Ping-Pong condition, although preferably it does not alter operation.

When the slave detects a Ping-Pong condition, it stops trying to match the incoming codec, and leaves its current codec open. It then waits for a period to see if the master can resolve the conflict. Preferably, the waiting period used by the slave is approximately one H.245-measured round trip time (RT) from the point that the Ping-Pong condition is detected. This allows the master time to synchronize to the slave's codec.

Figure 10:
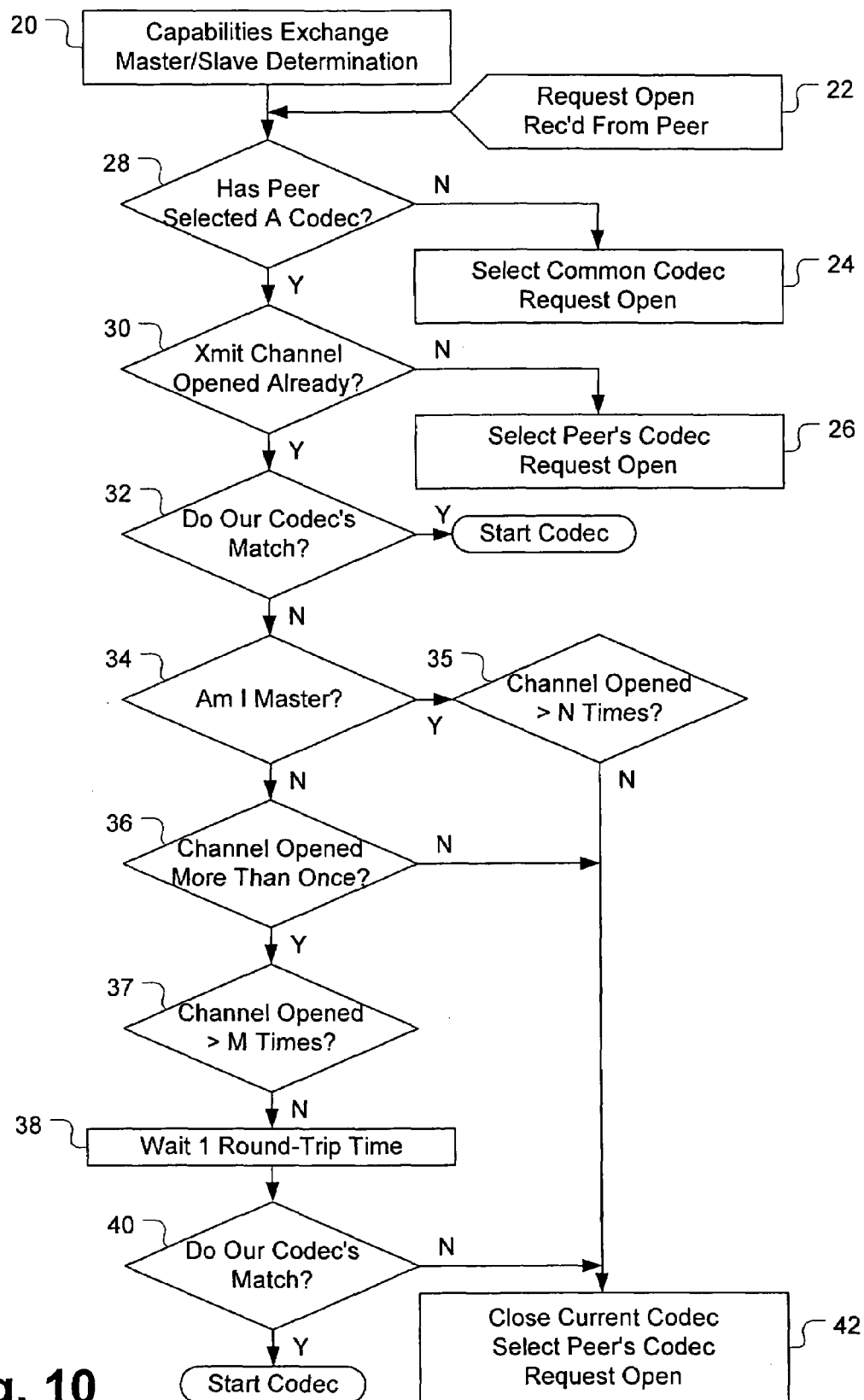
FIG. 10 contains a flowchart illustrating decision paths for an embodiment of the invention.

The flowchart of FIG. 10 summarizes the operation of one embodiment of the invention. In this embodiment, symmetrical codec setup logic is executed by an endpoint: 1) immediately after master/slave determination and receipt of the peer's capabilities; and 2) each time a request to open a logical channel is received from the peer. Note that some H.323 calls may use more than one type of channel (e.g., video and monaural audio)—each type would be considered separately for symmetrization.

After block 20 or upon receiving a request to open at block 22, the endpoint determines, at block 28, whether the peer has already selected a transmit codec. If the peer has not, the endpoint branches to block 24, selects a codec that both endpoints support, and sends the peer a request to open this codec. If the peer has already selected a transmit codec, the endpoint branches instead to decision block 30.

At decision block 30, the endpoint checks whether it has already opened a transmit channel. If it has not, it branches to block 26 and requests a transmit channel using the peer's codec. If it has already opened a transmit channel, the endpoint branches to block 32.

At decision block 32, if the codecs match, the matching logic is done and the codec can be started. But if both endpoints have opened and the codecs do not match, the matching logic then branches to decision block 34.

The purpose of decision blocks 34 and 36 is to implement Ping-Pong condition detection. If the endpoint is slave and no previous channel close/open retries have been attempted by the endpoint, the endpoint infers that no Ping-Pong condition exists, and branches to block 42. If the slave endpoint has already attempted at least one retry, however, the endpoint branches to block 37 and checks the number of times that it has tried to open the channel. If this number is greater than a preset maximum M (e.g., six tries), no more retries are attempted (although this step is optional, it ensures that the slave will not go on indefinitely in attempting to match). If the number of open channel requests does not exceed M, the slave delays for one round-trip time at block 38, and then checks, at decision block 40, whether the master has corrected the codec asymmetry. If it has not, the slave tries again to correct the asymmetry.

The master bypasses this Ping-Pong logic. Instead, the master implements a separate check (block 35) on the number of times that it has tried to open a channel. If this number exceeds a preset maximum N (e.g., three tries), no more retries are attempted by the master. This step ensures that the master will not go on indefinitely in attempting to match, and allows the slave additional time to match up if the endpoints are having difficulty synchronizing. If the number of open channel requests does not exceed N, the master branches to block 42 and tries to correct the asymmetry.

Block 42 performs the actual matching function by closing the endpoint's current codec, selecting the peer's codec, and sending a request to the peer to open a logical channel with that codec.

Several modifications to the basic flow diagram may be made to handle other situations. The slave may increase its delay during successive activations of block 38, in an attempt to allow a slow master time to synchronize. The logic of FIG. 10 (or similar logic) may also be used when a master endpoint refuses a channel request.

Figure 11:
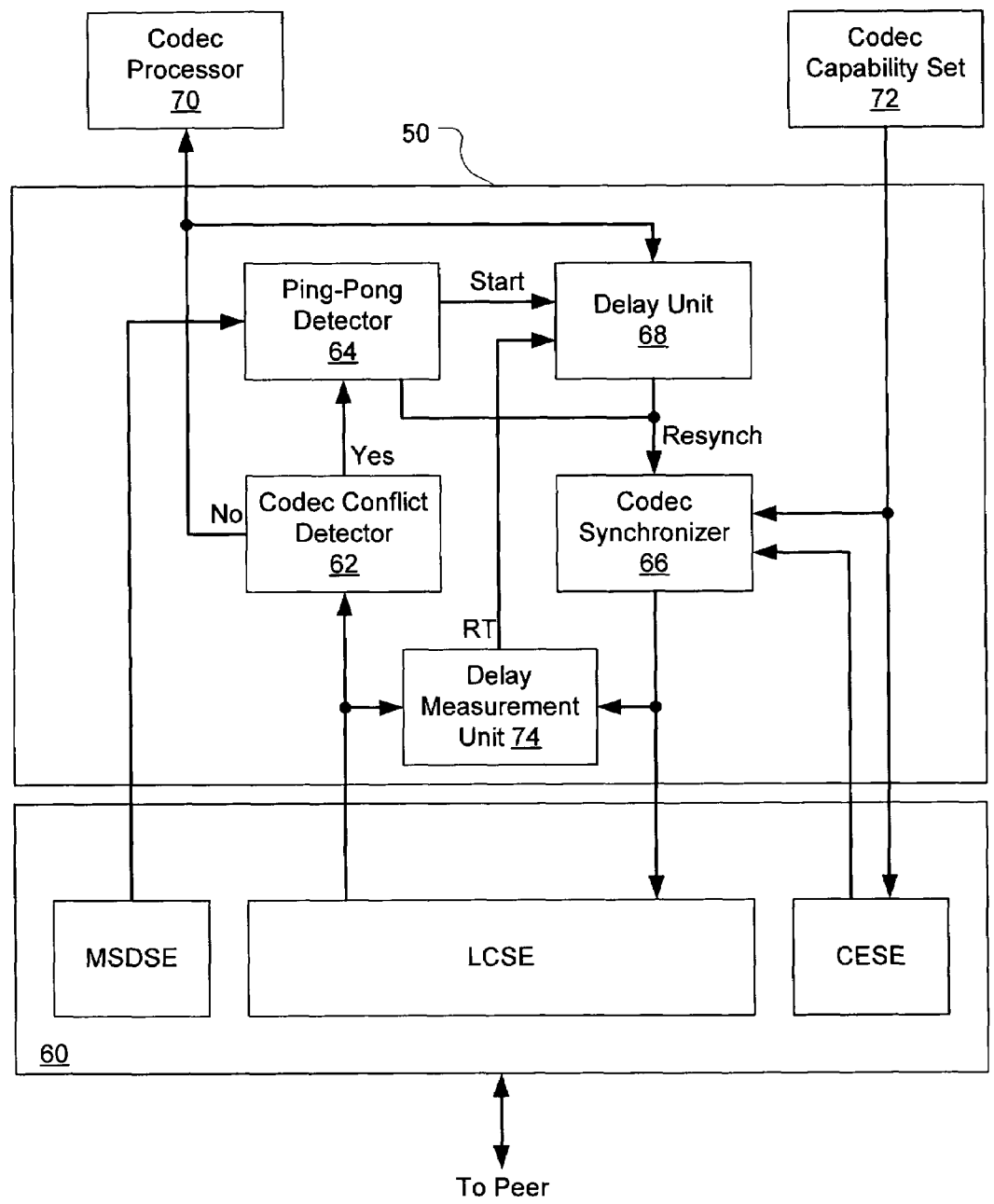
FIG. 11 shows a call signaling handler according to an embodiment of the invention.

FIG. 11 illustrates a logical channel codec selector 50 according to an embodiment of the invention. Codec selector 50 communicates with H.245 protocol layer 60, which communicates in turn with a peer H.245 protocol layer local at the other endpoint. Codec selector 50 also indicates (directly or indirectly) to codec processor 70 when it is appropriate to begin using a particular codec and logical channel.

Several of the H.245 protocol "entities" are shown in FIG. 11. The Master Slave Determination Signaling Entity (MSDSE), Logical Channel Signaling Entity (LCSE), and Capability Exchange Signaling Entity (CESE) are each designated in the H.245 protocol. Each of these entities either provides to and/or accepts from codec selector 50, primitives useful in the present invention.

Codec conflict detector 62 receives several types of messages from the LCSE. Conflict detector 62 receives an ESTABLISH.indication when the peer wishes to open an incoming channel (the sending of an ESTABLISH.response back to the peer will generally be handled by other logic not shown in FIG. 11). It also receives a RELEASE.indication when the peer closes an incoming channel. Further, for outgoing channels, conflict detector 62 receives ESTABLISH.confirm or RELEASE.indication messages from the peer, depending on whether an outgoing open channel request was acknowledged or rejected. Codec conflict detector 62 should also have knowledge of the ESTABLISH.request messages issued by codec synchronizer 66.

Upon receipt of an ESTABLISH.indication (and also, preferably, upon receipt of a TRANSFER.indication from the CESE), codec conflict detector 62 performs a codec check. Based on knowledge of each endpoint's current logical channel status (as seen from this end), codec conflict detector 62 asserts one of two signals. If the endpoints appear to have matched codecs, the indication signal "No" is asserted to indicate that no conflict exists. This signal indicates to codec processor 70 that it may begin processing media streams as the logical channels come up. This signal also resets delay unit 68. But if the endpoints have not matched codecs, conflict detector 62 asserts the "Yes" signal to Ping-Pong detector 64.

Ping-Pong detector 64 decides whether the endpoint should wait for the peer to resolve a conflict, or initiate an immediate resolution from this end. Ping-Pong detector 64 tracks some combination of channel open/close statistics, as described in conjunction with FIG. 10. Ping-Pong detector 64 also receives DETERMINE.confirm messages from the MSDSE, such that it knows whether its endpoint is Master or Slave. Based on statistics and Master/Slave status, Ping-Pong detector 64 decides whether to assert a Start signal to delay unit 68 or a Resynch signal to codec synchronizer 66.

When delay unit 68 detects that the Start signal has been asserted, it starts a timer with an expiration time of RT (supplied by delay measurement unit 74). If this timer expires without delay unit 68 being reset by codec conflict detector 62, delay unit 68 will assert the Resynch signal to codec synchronizer 66.

Codec synchronizer 66 is responsible for the origination of ESTABLISH.request and RELEASE.request messages for the outgoing logical channel. In addition to tracking its current requests, codec synchronizer 66 should also be aware of the peer's logical channel requests. Further, codec synchronizer 66 needs to know the capability set 72 that has been advertised to the peer, and the peer's capability set received from the CESE.

Delay measurement unit 74 estimates the round trip delay RT for the connection. Preferably, unit 74 notes the time of outgoing open channel requests, notes the time of corresponding confirm or reject indications, and infers from the time difference the round trip delay for open channel signaling. Although RT could also be estimated by issuing a TRANSFER.request to H.245 protocol layer 60's Round Trip Delay Signaling Entity (not shown), this is not preferred. Such a request measures round trip time to the H.245 peer, but would not include the additional delay incurred while the other endpoint responds to open and/or close channel requests. This difference may be appreciable if H.245 signaling is administered by a call agent that is physically separated from the logical channel endpoint.

Logical channel codec selector 50 may be implemented in special-purpose hardware, software running on a programmable processor, or implementations falling between these two extremes. It may run on a common processor with H.245 protocol layer 60, or on a common processor with codec 70, or all three may share a processor, such as in a personal computer. These functions may occupy two or more processors on a common endpoint platform, such as a media gateway. This need not be the case, however, and one or more of selector 50, layer 60, and codec processor 70 may even reside on a separate platform from the others. For instance, selector 50 and layer 60 may reside on a call agent (e.g., a media gateway controller) that handles call signaling for a large number of media endpoints. Codec processor 70 may reside on one of the controlled media endpoints. Although the blocks of selector 50 are shown directly communicating with H.245 layer 60, an intermediate layer or layers may reside between them in a given implementation. Other configurations will be apparent to those skilled in the art upon reading this disclosure.

Although the codec constraints discussed in the examples were "same codec" constraints, the present invention may be applied to other constraints, such as a limited asymmetry constraint where one-way high-computational complexity and one-way low-computational complexity codecs may be run together. The present invention can also be readily adapted to other protocol communication sequences, such as a "fast start" approach where logical channels are proposed prior to or simultaneously with capabilities exchange.

What is claimed is:

1. A method of establishing media channels between a local packet-switched media endpoint and a remote packet-switched endpoint, the method comprising:

receiving a remote capability set from the remote endpoint;
selecting a local media format appearing in both the remote capability set and a local capability set;
requesting a first transmit channel, in the local media format, with the remote endpoint;
detecting a remote media format of a remote transmit channel opened by the remote endpoint;
detecting potential conflicts between the first transmit channel local media format and the remote transmit channel remote media format; and
when a potential conflict is detected, closing the first transmit channel and requesting a second transmit channel in a media format that does not conflict with the remote transmit channel remote media format.

2. The method of claim 1, wherein the recited method is performed at the local endpoint.

3. The method of claim 1, wherein at least one of the recited method elements is performed by a call agent.

4. The method of claim 1, further comprising:
detecting, subsequent to the requesting a second transmit channel, that the remote endpoint has changed the remote transmit channel from the original remote media format to a current remote media format; and
closing the second transmit channel and opening a third transmit channel using the current remote media format.

5. The method of claim 1, further comprising:
detecting, subsequent to the requesting a second transmit channel, that the remote endpoint has changed the remote transmit channel from the original remote media format to a current remote media format;
delaying for a waiting period to see if the remote endpoint changes the remote transmit channel back to the original remote media format; and
when, after the waiting period, the remote endpoint has not changed the remote transmit channel back to the original remote media format, closing the second transmit channel and opening a third transmit channel using the current remote media format.

6. The method of claim 5, wherein the performing of the delaying for the waiting period depends on whether the local endpoint is designated as master or slave.

7. The method of claim 6, wherein the delaying for the waiting period is performed when the local endpoint is slave.

8. A codec selector comprising:
means for initiating a request for a locally-requested codec, from a set of codecs supported by a remote peer, prior to the codec selector receiving a request from the remote peer for a remotely-requested codec;
means for detecting conflicts between locally-requested and remotely-requested codecs; and
means for synchronizing a locally-requested codec with a remotely-requested codec in response to the means for detecting conflicts, the means for synchronizing operating to close a current locally-requested codec and request a different codec that does not conflict with the remotely-requested codec.

9. The codec selector of claim 8, embodied in a media gateway.

10. The codec selector of claim 8, embodied in a media gateway controller.

11. A codec selector comprising:
means for detecting conflicts between locally-requested and remotely-requested codecs;
means for synchronizing a locally-requested codec with a remotely-requested codec in response to a detected conflict detected by the means for detecting conflicts, the means for synchronizing operating to close an existing locally-requested codec and request a different codec that does not conflict with the remotely-requested codec; and
ping-pong detecting means, at a local endpoint, for detecting that a remote endpoint is operating a codec synchronizer.

12. The codec selector of claim 11, wherein the ping-pong detecting means counts responses to conflicts by the means for synchronizing.

13. The codec selector of claim 11, further comprising delay means, responsive to the ping-pong detecting means, for delaying the response to the conflict by the means for synchronizing, wherein the remote endpoint is allowed time to synchronize codecs with the local endpoint.

14. The codec selector of claim 13, wherein the delay means comprises a timer.

15. The codec selector of claim 14, further comprising a delay estimator, the delay estimator supplying the timer with an estimate of round-trip delay between dispatch of a request to the remote endpoint and receipt of a corresponding response from the remote endpoint.

16. The codec selector of claim 15, wherein the timer bases a timeout period on the estimate from the delay estimator.

17. The codec selector of claim 13, wherein the means for detecting conflicts signals the delay means to reset when the remote endpoint achieves codec synchronization.

18. The codec selector of claim 11, embodied in a media gateway.

19. The codec selector of claim 11, embodied in a media gateway controller.

20. A media gateway comprising:
a plurality of receive codecs and a plurality of transmit codecs;
a codec synchronizer that initiates a request for a first transmit codec, from a set of codecs supported by a remote endpoint, prior to the media gateway receiving a request from the remote endpoint for a receive codec; and
a codec conflict detector enabled to indicate, after receiving a request from the remote endpoint for a receive codec, that a second transmit codec is a better match for the receive codec than the first transmit codec;
the codec synchronizer responding to an indication from the codec conflict detector by closing the requested transmit codec and requesting the second transmit codec.

21. The media gateway of claim 20, further comprising a ping-gong detector to detect when the remote endpoint is also operating a codec synchronizer.

22. The media gateway of claim 21, wherein the ping-pong detector count responses to conflicts by the codec synchronizer.

23. The media gateway of claim 21, further comprising a delay unit, responsive to the ping-pong detector, to delay a response to a conflict by the codec synchronizer, thereby allowing time for the remote endpoint to synchronize codecs with a local endpoint.

24. The media gateway of claim 23, wherein the delay unit comprises a timer.

25. The media gateway of claim 24, further comprising a delay estimator, the delay estimator supplying the timer with an estimate of the round-trip delay between the dispatch of a request to the remote endpoint and the receipt of a corresponding response from the remote endpoint.

26. A computer-readable media containing computer instructions that, when executed by a processor, cause the processor to perform a method of establishing media channels between a local packet-switched endpoint and a remote packet-switched endpoint, the method comprising:
  receiving a remote capability set from the remote endpoint;
  selecting a local media format appearing in both the remote capability set and a local capability set;
  requesting a first transmit channel, in the local media format, with the remote endpoint;
  detecting a remote media format of a remote transmit channel opened by the remote endpoint;
  detecting potential conflicts between the first transmit channel local media format and the remote transmit channel remote media format; and
  when a potential conflict is detected, closing the first transmit channel and requesting a second transmit channel in a media format that does not conflict with the remote transmit channel remote media format.

27. The computer-readable media of claim 26, wherein the recited method is performed at the local endpoint.

28. The computer-readable media of claim 26, wherein at least one of the recited method elements is performed by a call agent.

29. The computer-readable media of claim 26, wherein the method further comprises:
  detecting, subsequent to the requesting a second transmit channel, that the remote endpoint has changed the remote transmit channel from the original remote media format to a current remote media format; and
  closing the second transmit channel and opening a third transmit channel using the current remote media format.

30. The computer-readable media of claim 26, wherein the method further comprises:
  detecting, subsequent to the requesting a second transmit channel, that the remote endpoint has changed the remote transmit channel from the original remote media format to a current remote media format;
  delaying for a waiting period to see if the remote endpoint changes the remote transmit channel back to the original remote media format; and
  when, after the waiting period, the remote endpoint has not changed the remote transmit channel back to the original remote media format, closing the second transmit channel and opening a third transmit channel using the current remote media format.

31. The computer-readable media of claim 30, wherein the performing of the delaying for the waiting period depends on whether the local endpoint is designated as master or slave.

32. The computer-readable media of claim 31, wherein the delaying for the waiting period is performed when the local endpoint is slave.

* * * * *

UNITED STATES PATENT AND TRADEMARK OFFICE
CERTIFICATE OF CORRECTION

| | |
|---|---|
| PATENT NO. | : 7,352,710 B1 |
| APPLICATION NO. | : 10/683689 |
| DATED | : April 1, 2008 |
| INVENTOR(S) | : Pandit Panburana et al. |

Page 1 of 1

It is certified that error appears in the above-identified patent and that said Letters Patent is hereby corrected as shown below:

Column 1, Line 3, insert heading -- RELATED APPLICATION DATA --.

Column 9, Line 67, after "a" delete "detected".

Column 10, Line 51, delete "ping-gong" and insert -- ping-pong --, therefor.

Signed and Sealed this

Twenty-second Day of December, 2009

David J. Kappos
*Director of the United States Patent and Trademark Office*